Patented Oct. 4, 1938

2,132,250

UNITED STATES PATENT OFFICE 2,132,250

MANUFACTURE OF ETHYL ALCOHOL FROM INDIAN CORN

Theodore B. Wagner, New York, N. Y.

No Drawing. Application March 28, 1934, Serial No. 717,834

7 Claims. (Cl. 195—16)

This invention relates to improvements in the manufacture of ethyl alcohol from Indian corn and, more particularly, to a process of producing a high quality ethyl alcohol substantially free from impurities.

It is well known that in the production of ethyl alcohol from corn certain impurities are imparted to the alcohol, such as fusel oil and ester-like derivatives of fatty acids. The former originates in the amino-acids of the corn, which are natural constituents thereof; the latter are derived from the oil, likewise naturally contained in corn, and are formed through catalytic and enzymic processes referred to hereinafter. These impurities are carried over with the alcohol while the alcohol is being separated from the fermented mash by distillation. Various attempts have been made to overcome the disadvantages of prior processes and to prevent the presence of these impurities in the finished alcohol, but, as far as I am aware, prior attempts have been limited to eliminate the impurities, formed during the fermentation of the mash, either by high rectification of the alcohol or by a treatment thereof with chemical agents.

An object of my invention is to keep out of the mash those constituents of corn, which are the source of the impurities in the finished alcohol and I have discovered a process which accomplishes the object.

It is also an object of the invention to provide a process, which can be carried out on an industrial scale and with a high degree of efficiency.

It is also within the contemplation of the invention to provide a process, which can be carried into practice with simple and standard apparatus and which not only produces alcohol of high purity but enhances the value of the by-products obtained in the manufacture of alcohol from corn.

Other objects and advantages of the invention will become apparent from the following description of a preferred procedure of carrying the invention into practice.

Shelled corn is conveyed to suitable tanks and immersed completely in water, at an elevated temperature, for a period of preferably from about 40 to about 60 hours. In practice I prefer to maintain the temperature of the water at about 115° F. to about 125° F., although a higher temperature may at times be advisable. When higher temperatures are used care must be taken that the temperatures do not rise too high with resulting gelatinization of the starch of the corn. Throughout the immersion period, it is preferred to leach the corn by keeping the water in circulation by any suitable means. This circulation serves not only to remove impurities including amino-acids, but also favorably conditions the corn for the separation of the germs as more fully described hereinafter. In the foregoing leaching, I prefer to employ about eight gallons of water to each bushel of corn and to dissolve a small quantity of sulfur dioxide in the water before the immersion of the corn therein so as to guard against a decomposition of the corn.

At the conclusion of the aforesaid operation, I withdraw the water from the corn and apply to the corn one or more washings with water in order to free the corn from water soluble substances, especially the amino-acids, which, as above stated, lead to the formation of fusel oil and to its presence in the finished alcohol. In practice I prefer to subject the corn to a double and even triple washing with fresh water. For gauging the efficacy of these washing operations in leaching the amino-acids from the corn, I use the Abderhalden "ninhydrine" test. The intensity of the color reaction serves as an index of the degree of elimination achieved. If the test results negatively, the complete removal of the amino-acids is indicated; if positively, washing may be continued until the desired degree is reached.

The washed corn is next delivered to attrition or "cracking" mills. The plates of the cracking mills are so distanced that the mills, with the aid of water, do not actually grind, but merely "crack" the corn. The cracked corn, together with a suitable amount of "starch milk", is conveyed to suitable vats, preferably of semi-cylindrical shape and of adequate length, width and height, say 10 feet long, by 3 feet wide and 5 feet high, in which the separation of the oil bearing germs takes place. The separation of the germs from the remainder of the corn is rendered possible by the difference in specific gravity between the oil bearing germs and the starch milk used as the separating medium. The starch milk is preferably made up from starch and water, so as to have a specific gravity corresponding to about 10–12° Baumé, which causes the germs to rise to the surface of the starch milk, together with a portion of the hulls, whereas the remainder of the corn (i. e., a mixture of coarse starch particles, of starch suspended in water, of the gluten and the balance of the hulls) collects at the bottom of the vats and is carried off by a suitable conveying device. The vats are arranged in such manner that the inlet at the top is at a higher level than the outlet for the germs and thus the latter are carried off from the surface of the contents of the vats in a continuous flow, together with a portion of the starch milk.

For the purpose of obtaining ethyl alcohol of high purity, which necessitates freeing the corn not only from amino-acids, but from oil and fatty acids as well, I have found it advantageous to submit the cracked corn, discharged through the bottom outlet of the germ separating vats, to a second and even third separation, i. e., I pass it again through the cracking mills or through the germ separating vats, or both, and, if advisable, repeat the operation a third time. I have observed that the cracked corn, after leaving the first separating vat, frequently contains a number of germs which escaped liberation during the first separation and these, I have further observed, can be recovered by a repetition of the cracking and separating procedure. When applying the second and third separations, I have found it preferable to vary the density of the starch milk from that employed during the first separation, making it lighter or heavier, as may best suit conditions. The collected germs are transferred to reels in which they are thoroughly washed with water and thereby freed from adhering starch, which is collected separately and is ultimately delivered to the "cookers", referred to hereinafter. The washed germs are subsequently dried in steam drums and are finally delivered to the oil extractors which serve to expel the oil, known at this stage as crude corn oil. The residual portion may be marketed as germ oil meal or it may be mixed with the residual portion of the "mash", or it may be delivered to the "cooker", both "mash" and "cooker" being more fully described hereinafter.

By following the foregoing procedure, it is possible to obtain a yield of crude corn oil which is substantially at the rate of one and one-half pound per bushel of corn. It is to be noted that this yield is at least double that obtained heretofore in the manufacture of ethyl alcohol from corn degerminated in a dry state.

The degerminated corn, discharged at the bottom outlet of the germ separating vats, so-called "separators", represents a mixture of starch, gluten, hulls and water. This mixture, which is substantially free from water and ether soluble substances, is next delivered to an apparatus known as a "cooker", without further processing, though a grinding in burr mills may at times be advantageous. In the cooker, first liquefaction and then saccharification of the starch of the corn are effected through the conjoint action of malt, heat and water. The charge in the cooker is known as the "mash". After cooking and subsequently cooling the mash, it is transferred to vats in which the fermentation i. e., the conversion into alcohol is carried on at a suitable temperature. For instance, a temperature of about 65–80° F. may be used after inoculation of the mash with a suitable fermentating medium, such as "distiller's seed yeast." The fermentation is usually completed within about 72 hours. Upon conclusion of the fermentation, the mash is conveyed to distilling and re-distilling apparatus of conventional types, which effect the separation of ethyl alcohol from the water and other ingredients of the mash. Because of the absence in the raw alcohol of the impurities which hitherto have always contaminated the alcohol, the rectification is greatly facilitated with a final product of prime quality as the result.

The residual portion of the mash I collect and wash, preferably in a filter press, and then deliver it to an initial dryer, of any suitable design, in which the moisture content is reduced to about 40%, whereupon I impregnate the semi-dry residue with the extract of the soluble constituents of corn as obtained during the immersion of the corn in water. When drained from the steeping tanks, this extract usually has a specific gravity corresponding to about 5–6° Baumé. I prefer to concentrate it in vacuo to about 23° Baumé, in which state of concentration it has the consistency of a light bodied syrup, and I incorporate this syrup with the aforesaid semi-dry residue and thereupon deliver the mixture to a second dryer, in which the moisture of the mixture is reduced to approximately 10%. After grinding and screening, it is ready for the market. It is characterized by a high content of nitrogenous substances, especially amino-acids, freedom from starch and a nearly complete absence of free fatty acids and ether soluble substances.

While heretofore the dried residue, obtained in the manufacture of ethyl alcohol from corn, was used exclusively as a concentrated animal feeding stuff, the residue obtained by my new method, as described hereinabove, lends itself to culinary purposes and is especially well suited to a nutritional enrichment of cereal and other foods intended for human consumption.

It will be noted that whereas under the old method the conditioning of the corn, prior to mashing, is effected by milling the corn in a dry state, my improvement calls for the complete immersion of the corn in water, and even after the water used during the immersion, is withdrawn from the corn, the further processing of the corn is carried on in the presence of large quantities of water.

As a result of my improved method of manufacture, the distillate, i. e., the ethyl alcohol obtained from the fermented mash, is of a high quality and since the first and last runs of the distillation, the so-called "heads" and "tails", are materially reduced in amount, a correspondingly increased yield of pure alcohol is obtained. Although it is not likely that anyone, skilled in the art, will confuse my new method, as above described, with the process customarily employed in present day manufacture of alcohol from corn, I recapitulate its essential differentiating features as follows: the immersion of the corn in water, followed by processing in a wet state; the removal of the soluble constituents of the corn, especially amino-acids; the recovery of the soluble constituents of the corn in the form of a syrup; the substantially complete removal of the oil bearing germs of the corn; the recovery of the oil of corn; the substantial absence of higher alcohols, as derived from corn, in the alcohol obtained after the distillation of the fermented mash; finally, the increased yield of prime ethyl alcohol, due to the substantial absence of higher alcohols.

I claim:

1. The manufacture of substantially pure ethyl alcohol practically devoid of fusel oil from Indian corn which comprises leaching Indian corn with hot water containing sulfur dioxide to dissolve water soluble substances and amino acids, washing the thus-leached corn with water to free it from water-soluble substances including amino acids, subjecting the wash waters to the Abderhalden "ninhydrine" test to determine the presence of amino acids, continuing the said washing with fresh water until said test gives negative results to produce leached corn freed from amino acids, cracking the leached corn to produce a mass containing cracked corn and oil bearing germs, separating the said germs from said cracked corn, subjecting said degerminated cracked corn freed from amino acids and containing hulls to the action of heat in the presence of water and a small amount of malt to liquefy and then to saccharify the same, cooling the liquefied and saccharified mass, fermenting the said cooled mass at about 65° F. to about 80° F. in the presence of "distiller's seed yeast" to produce ethyl alcohol, and distilling the said fermented mass to obtain substantially pure ethyl alcohol practically devoid of fusel oil.

2. The manufacture of substantially pure ethyl alcohol practically devoid of fusel oil from Indian corn which comprises leaching Indian corn at about 115° F. to about 125° F. with hot water containing sulfur dioxide, washing the thus-leached corn with water to free it from water-soluble substances including amino acids, subjecting the wash waters to the Abderhalden "ninhydrine" test to determine the presence of amino acids, continuing the said washing with fresh water until said test gives negative results to produce leached corn feed from amino acids, cracking the leached corn to procduce a mass containing cracked corn and oil bearing germs, separating the said germs from said cracked corn, subjecting said degerminated cracked corn freed from amino acids to the action of heat in the presence of water and a small amount of malt to liquefy and then to saccharify the same, cooling the liquefied and saccharified mass, fermenting the said cooled mass at about 65° F. to about 80° F. in the presence of "distiller's seed yeast" to produce ethyl alcohol, and distilling the said fermented mass to obtain substantially pure ethyl alcohol practically devoid of fusel oil.

3. The manufacture of substantially pure ethyl alcohol practically devoid of fusel oil from Indian corn which comprises leaching Indian corn at about 115° F. to about 125° F. with hot water, containing sulfur dioxide, for about 40 to about 60 hours to dissolve water soluble substances and amino acids, washing the thus-leached corn with water to free it from water-soluble substances including amino acids, subjecting the wash waters to the Abderhalden "ninhydrine" test to determine the presence of amino acids, continuing the said washing with fresh water until said test gives negative results to produce leached corn freed from amino acids, cracking the leached corn to produce a mass containing cracked corn and oil bearing germs, separating the said germs from said cracked corn, subjecting said degerminated cracked corn freed from amino acids to the action of heat in the presence of water and a small amount of malt to liquefy and then to saccharify the same, cooling the liquefied and saccharified mass, fermenting the said cooled mass at about 65° F. to about 80° F. in the presence of "distiller's seed yeast" to produce ethyl alcohol, and distilling the said fermented mass to obtain substantially pure ethyl alcohol practically devoid of fusel oil.

4. The manufacture of substantially pure ethyl alcohol practically devoid of fusel oil from Indian corn which comprises leaching Indian corn with hot water containing sulfur dioxide to dissolve water soluble substances and amino acids, the said hot water being used in the amount of about 8 gallons to about one bushel of corn, washing the thus-leached corn with water to free it from water-soluble substances including amino acids, subjecting the wash waters to the Abderhalden "ninhydrine" test to determine the presence of amino acids, continuing the said washing with fresh water until said test gives negative results to produce leached corn freed from amino acids, cracking the leached corn to produce a mass containing cracked corn and oil bearing germs, separating the said germs from said cracked corn, subjecting said degerminated cracked corn freed from amino acids to the action of heat in the presence of water and a small amount of malt to liquefy and then to saccharify the same, cooling the liquefied and saccharified mass, fermenting the said cooled mass at about 65° F. to about 80° F. in the presence of "distiller's seed yeast" to produce ethyl alcohol, and distilling the said fermented mass to obtain substantially pure ethyl alcohol practically devoid of fusel oil.

5. The manufacture of substantially pure ethyl alcohol practically devoid of fusel oil from Indian corn which comprises leaching Indian corn with hot water, containing sulfur dioxide to dissolve water soluble substances and amino acids, washing the thus-leached corn with water to free it from water-soluble substances including amino acids, subjecting the wash waters to the Abderhalden "ninhydrine" test to determine the presence of amino acids, continuing the said washing with fresh water until said test gives negative results to produce leached corn freed from amino acids, cracking in the presence of water the leached corn to produce a mass containing cracked corn and oil bearing germs, separating the said germs from said cracked corn, subjecting said degerminated cracked corn freed from amino acids to the action of heat in the presence of water and a small amount of malt to liquefy and then to saccharify the same, cooling the liquefied and saccharified mass, fermenting the said cooled mass at about 65° F. to about 80° F. in the presence of "distiller's seed yeast" to produce ethyl alcohol, and distilling the said fermented mass to obtain substantially pure ethyl alcohol practically devoid of fusel oil.

6. The manufacture of substantially ethyl alcohol practically devoid of fusel oil from Indian corn which comprises leaching Indian corn with hot water containing sulfur dioxide to dissolve water soluble substances and amino acids, washing the thus-leached corn with water to free it from water-soluble substances including amino acids, subjecting the wash waters to the Abderhalden "ninhydrine" test to determine the presence of amino acids, continuing the said washing with fresh water until said test gives negative results to produce leached corn freed from amino acids, cracking the leached corn to produce a mass containing cracked corn having a specific gravity of about 10 to about 12° Baumé and oil bearing germs, separating the said germs from said cracked corn, subjecting said degerminated cracked corn freed from amino acids to the action of heat in the presence of water and a small amount of malt to liquefy and then to saccharify the same, cooling the liquefied and saccharified mass, fermenting the said cooled mass at about 65° F. to about 80° F. in the presence of "distiller's seed yeast" to produce ethyl alcohol, and distilling the said fermented mass to obtain substantially pure ethyl alcohol practically devoid of fusel oil.

7. The manufacture of substantially pure ethyl alcohol practically devoid of fusel oil from Indian corn which comprises leaching Indian corn with hot water containing sulfur dioxide to dissolve water soluble substances and amino acids, washing the thus-leached corn with water to free it from water-soluble substances including amino acids, subjecting the wash waters to the Abderhalden "ninhydrine" test to determine the presence of amino acids, continuing the said washing with fresh water until said test gives negative results to produce leached corn freed from amino acids, cracking the leached corn to produce a mass containing cracked corn and oil bearing germs, separating the said germs from said cracked corn, subjecting said degerminated cracked corn freed from amino acids to the action of heat in the presence of water and a small amount of malt to liquefy and then to saccharify the same, cooling the liquefied and saccharified mass, fermenting the said cooled mass at about 65° F. to about 80° F. in the presence of "distiller's seed yeast" for about 72 hours to produce ethy alcohol, and distilling the said fermented mass to obtain substantially pure ethyl alcohol practically devoid of fusel oil.

THEODORE B. WAGNER.